United States Patent
Yano et al.

(10) Patent No.: US 6,791,645 B2
(45) Date of Patent: Sep. 14, 2004

(54) OPTICAL SHEET, POLARIZER AND LIQUID-CRYSTAL DISPLAY DEVICE

(75) Inventors: Shuuji Yano, Osaka (JP); Yuuichi Nishikouji, Osaka (JP)

(73) Assignee: Nitto Denko Corporation, Osaka (JP)

( * ) Notice: Subject to any disclaimer, the term of this patent is extended or adjusted under 35 U.S.C. 154(b) by 141 days.

(21) Appl. No.: 09/967,983

(22) Filed: Oct. 2, 2001

(65) Prior Publication Data

US 2002/0039159 A1 Apr. 4, 2002

(30) Foreign Application Priority Data

Oct. 2, 2000 (JP) ..................................... P2000-302175

(51) Int. Cl.⁷ ............................................. G02F 1/1335
(52) U.S. Cl. ..................... 349/118; 349/117; 349/96; 349/99
(58) Field of Search ............................ 349/118, 117, 349/96, 99

(56) References Cited

U.S. PATENT DOCUMENTS

| | | | |
|---|---|---|---|
| 5,579,139 A | | 11/1996 | Abileah et al. |
| 5,793,455 A | * | 8/1998 | Nakamura ................. 349/96 |
| 6,088,079 A | * | 7/2000 | Kameyama et al. ........ 349/185 |
| 6,219,122 B1 | * | 4/2001 | Uchida et al. .............. 349/117 |
| 6,330,108 B1 | * | 12/2001 | Nishikouji et al. ......... 359/499 |
| 6,331,882 B1 | * | 12/2001 | Shimodaira et al. ........ 349/122 |
| 6,339,460 B1 | * | 1/2002 | Saitoh ....................... 349/117 |
| 6,433,853 B1 | * | 8/2002 | Kameyama et al. ........ 349/176 |
| 6,710,830 B2 | * | 3/2004 | Yano et al. ................. 349/96 |
| 2001/0002153 A1 | * | 5/2001 | Yano ......................... 359/599 |
| 2001/0008433 A1 | * | 7/2001 | Fujii et al. .................. 349/12 |

FOREIGN PATENT DOCUMENTS

| | | | |
|---|---|---|---|
| JP | 62-210423 | 9/1987 | .......... G02F/1/133 |
| JP | 4-305602 | * 10/1992 | |
| JP | 4-371903 | * 12/1992 | |
| JP | 5-27119 | * 2/1993 | |
| JP | 8-294986 | * 11/1996 | |
| JP | 10-48625 | * 2/1998 | |
| JP | 2002-90531 | * 3/2002 | |

* cited by examiner

*Primary Examiner*—Nathan J. Flynn
*Assistant Examiner*—Ahmed N. Sefer
(74) *Attorney, Agent, or Firm*—Sughrue Mion, PLLC

(57) ABSTRACT

An optical sheet is constituted by: a retardation film; and a transparent layer provided on one of opposite surfaces of the retardation film. The retardation film exhibits $Nz=(nx-nz)/(nx-ny)$ in a range of from 0.4 to 0.6, both not inclusively, and $(nx-ny)d$ in a range of from 200 to 350 nm when $nx>ny$ in which d is the thickness of the retardation film, nz, nx and ny are a refractive index in a direction of the thickness d of the retardation film, a refractive index in a direction of the retardation film in the same plane as the direction of nx, and a refractive index in a direction of the retardation film in the same plane as the direction of nx, respectively. The transparent layer has a thickness not larger than 10 μm and exhibits refractive index anisotropy of $nx \approx ny > nz$.

8 Claims, 1 Drawing Sheet

OPTICAL SHEET, POLARIZER AND LIQUID-CRYSTAL DISPLAY DEVICE

BACKGROUND OF THE INVENTION

1. Field of the Invention

The present invention relates to an optical sheet by which light between polarizers disposed in the form of crossed-Nicol can be cut off at wide-ranging azimuth angles so that a good-display-quality vertically oriented liquid-crystal display device which is excellent in viewing angle and contrast can be formed.

The present application is based on Japanese Patent Application No. 2000-302175, which is incorporated herein by reference.

2. Description of the Related Art

Even in the case where light between polarizers disposed in the form of crossed-Nicol was cut off in a normal-line (frontal) direction in which an axis of transmission and an axis of absorption functioned normally, there was heretofore a problem that light leakage occurred in a displaced viewing azimuth crossing the optical axis so that the intensity of leakage light increased gradually as the angle of oblique viewing increased. The problem was revealed as a disadvantage that display quality was deteriorated by reduction in display contrast due to light leakage in a viewing azimuth displaced from the optical axis when the polarizers were disposed on opposite sides of the liquid-crystal cell in the form of crossed-Nicol to function as a polarizer and an analyzer to thereby form a liquid-crystal display device.

In a vertically oriented (VA) liquid-crystal cell in which liquid-crystal molecules were oriented approximately vertically with respect to a cell substrate so that light was able to be transmitted with little change of the plane of polarization, when polarizers were disposed in the form of crossed-Nicol on opposite sides of the cell, light was apt to be cut off in a frontal (normal) direction of a display panel perpendicular to the cell substrate in an inoperative mode having no external voltage applied to thereby make it possible to form good black display easily, in comparison with a TN liquid-crystal cell or the like in which liquid-crystal molecules were oriented horizontally with respect to a cell substrate so that display quality was apt to be deteriorated by light leakage owing to birefringence of the liquid-crystal cell at light transmission. However, the problem that contrast was deteriorated by light leakage in an oblique viewing azimuth displaced from the optical axis of the polarizers because of the aforementioned problem caused by the polarizers still remained, even if a phase retarder exhibiting refractive index anisotropy of nx=ny>nz as disclosed in Unexamined Japanese Patent Publication Sho. 62-210423 was used in combination with the vertically oriented liquid-crystal cell for compensating for birefringence of the liquid-crystal cell caused by oblique viewing.

SUMMARY OF THE INVENTION

An object of the present invention is to develop a member capable of suppressing light leakage even in an oblique viewing azimuth displaced from the optical axis between polarizers disposed in the form of crossed-Nicol to thereby obtain a vertically oriented liquid-crystal display device which is good in display quality and which is excellent in contrast at wide-ranging viewing angles.

According to an aspect of the present invention, there is provided an optical sheet constituted by a retardation film, and a transparent layer provided on one of opposite surfaces of the retardation film. The retardation film exhibits $Nz=(nx-nz)/(nx-ny)$ in a range of from 0.4 to 0.6, both not inclusively, and $(nx-ny)d$ in a range of from 200 to 350 nm in which d is a thickness of the retardation film, nz is a refractive index in a direction of a Z axis expressing a direction of the thickness d of the retardation film, nx is a refractive index in a direction of an X axis expressing a direction of the retardation film in a plane perpendicular to the Z axis while the X axis expresses a direction of the highest in-plane refractive index, and ny is a refractive index in a direction of a Y axis expressing a direction of the retardation film perpendicular both to the Z axis and to the X axis. And the transparent layer has a thickness not larger than 10 $\mu$m and exhibits refractive index anisotropy of nx≈ny>nz.

According to another aspect of the present invention, there is provided a polarizer constituted by a laminate of an optical sheet as defined above, and a polarizing film. According to a further aspect of the present invention, there is provided a liquid-crystal display device constituted by a vertically oriented liquid-crystal cell, and a pair of polarizers as defined above, the pair of polarizers being provided on opposite sides of the cell in the form of crossed-Nicol. Further, at least one of the polarizers has the above optical sheet and its transparent layer is positioned on corresponding one of opposite sides of the cell. According to a still further aspect of the present invention, there is provided a liquid-crystal display device constituted by a pair of polarizers disposed in the form of crossed-Nicol on opposite sides of the liquid-crystal cell, and a phase retarder disposed between the liquid-crystal cell and one or each of the polarizers, one of the polarizers having the above optical sheet. The phase retarder exhibits refractive index anisotropy of nx≈ny>nz, and an absolute value of a thicknesswise retardation defined by a product of $\{(nx+ny)/2-nz\}$ and a layer thickness of the transparent layer in the polarizer having the above optical sheet is in a range of from 0.5 time to 1.3 times as large as an absolute value of a thicknesswise retardation of the liquid-crystal cell.

When the optical sheet according to the present invention is used as a transparent protective layer or the like, a polarizer can be formed. When the polarizer is used as one of polarizers disposed in the form of crossed-Nicol on opposite sides of a vertically oriented liquid-crystal cell, light can be blocked out in the direction of the optical axis of the polarizer in the same manner as that in the background art while birefringence of the liquid-crystal cell can be compensated for in an oblique viewing direction. Hence, light leakage can be suppressed even in an azimuth displaced from the optical axis. Hence, there can be formed a vertically oriented liquid-crystal display device which is excellent in contrast at wide-ranging viewing angles and which is good in display quality. Because the optical sheet can be used as a transparent layer for protecting a polarizing film, reduction in thickness of the polarizer or the liquid-crystal display device can be attained.

Features and advantages of the invention will be evident from the following detailed description of the preferred embodiments described in conjunction with the attached drawings.

DETAILED DESCRIPTION OF THE PREFERRED EMBODIMENTS

Figure 1:
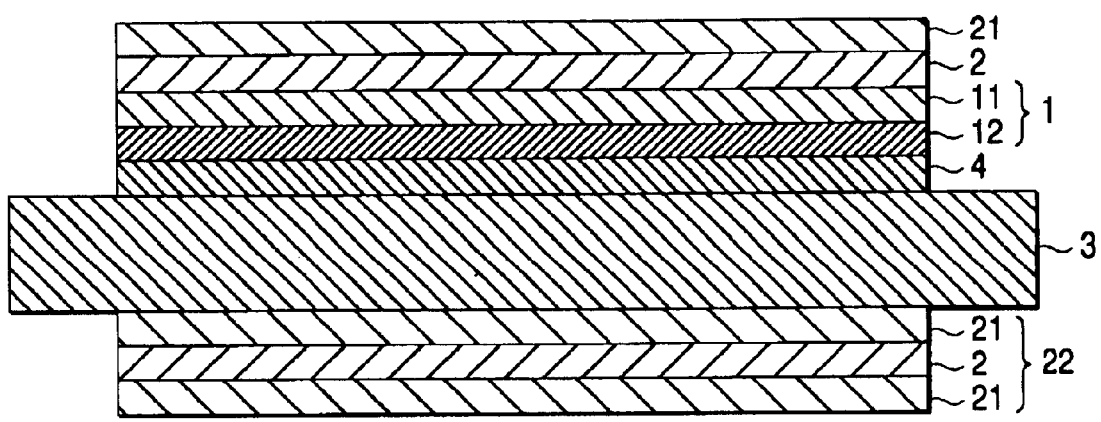
FIG. 1 is a sectional view showing an embodiment of the present invention.

The optical sheet according to the present invention comprises: a retardation film; and a transparent layer provided on one of opposite surfaces of the retardation film, wherein the retardation film exhibits Nz=(nx−nz)/(nx−ny) in a range of from 0.4 to 0.6, both not inclusively, and (nx−ny)d in a range of from 200 to 350 nm in which d is a thickness of the retardation film, nz is a refractive index in a direction of a Z axis expressing a direction of the thickness d of the retardation film, nx is a refractive index in a direction of an X axis expressing a direction of the retardation film in a plane perpendicular to the Z axis while the X axis expresses a direction of the highest in-plane refractive index, and ny is a refractive index in a direction of a Y axis expressing a direction of the retardation film perpendicular both to the Z axis and to the X axis, and wherein the transparent layer has a thickness not larger than 10 μm and exhibits refractive index anisotropy of nx≈ny>nz.

FIG. 1 shows an example of the optical sheet. In FIG. 1, the optical sheet 1 comprises a retardation film 11, and a transparent layer 12. Incidentally, FIG. 1 shows a liquid-crystal display device which comprises the optical sheet 1, a polarizing film 2 including a transparent protective layer 21, a polarizer 22, a vertically oriented liquid-crystal cell 3, and a phase retarder 4.

As the retardation film, it is possible to use a suitable one which exhibits Nz=(nx−nz)/(nx−ny) in a range of from 0.4 to 0.6, both not inclusively, preferably in a range of from 0.45 to 0.55, and a retardation (nx−ny)d in a range of from 200 to 350 nm, preferably in a range of from 230 to 300 nm, more preferably in range of from 250 to 280 nm in which d is the thickness of the retardation film, nz is a refractive index in a direction of a Z axis expressing a direction of the thickness d of the retardation film, nx is a refractive index in a direction of an X axis expressing a direction of the retardation film in a plane perpendicular to the Z axis while the X axis expresses a direction of the highest in-plane refractive index, and ny is a refractive index in a direction of a Y axis expressing a direction of the retardation film perpendicular both to the Z axis and to the X axis.

Any suitable polymer may be used for forming the retardation film without any particular limitation. Examples of the polymer may include: polycarbonate or polyallylate; polysulfone or polyolefin such as polypropylene; polyester such as polyethylene terephthalate or polyethylene naphthalate; norbornene polymer or acrylic polymer; styrene polymer or cellulose polymer; a mixture polymer formed by selecting two kinds of polymers or three or more kinds of polymers from these polymers; and so on.

For example, the retardation film having the aforementioned characteristic can be obtained as a drawn film or the like constituted by a polymer film drawn by a suitable system such as uniaxial drawing or biaxial drawing. Preferably, the retardation film is a polymer film in which optical characteristic such as retardation can be controlled in accordance with the change of the kind of polymer, the drawing condition, and so on, and which is excellent in light transmittance and small in orientation irregularity and retardation irregularity. The retardation film may be a suitable one which is made from a polymer film provided with a heat-shrinkable film bonded to the polymer film so that the thicknesswise refractive index of the polymer film is controlled under the action of shrinking force of the heat-shrinkable film by heating. Alternatively, the retardation film may be provided as a multilayer film of two or more retardation layers in order to control optical characteristic.

The transparent film provided on one of opposite surfaces of the retardation film has a thickness not larger than 10 μm and exhibits refractive index anisotropy of nx≈ny>nz in which nz is the refractive index in a direction of a Z axis expressing a direction of the thickness of the transparent film, nx is the refractive index in a direction of an X axis expressing a direction of the transparent film in a plane perpendicular to the Z axis, and ny is the refractive index in a direction of a Y axis expressing a direction of the transparent film perpendicular both to the Z axis and to the X axis. The relation nx≈ny means that a variation of 10 nm or less on the basis of the retardation given by the product of |nx−ny| and the thickness of the transparent layer can be allowed. Hence, the relation nx≈ny includes the case of nx=ny.

When the thickness of the transparent layer is selected to be not larger than 10 μm, reduction in thickness of the optical sheet can be achieved so that the layer can be used as a transparent layer for protecting the polarizing film. The transparent layer can be formed from a suitable material exhibiting the aforementioned refractive index anisotropy and by a suitable system. A coating system using an organic material is used preferably from the point of view of forming a flexible thin layer easily, and so on. A suitable system such as gravure coating, die coating or dip coating can be used as the coating system. A system of transferring a coating solution layer or a coating film provided on another film may be also used.

The material preferably used for forming the transparent layer from the point of view of achieving the refractive index anisotropy of nx≈ny>nz while satisfying the aforementioned reduction in film thickness is a material which can form a cholesteric liquid-crystal layer constituted by a cholesteric liquid-crystal polymer, a chiral-agent-mixed nematic liquid-crystal polymer, a compound capable of forming such a liquid-crystal polymer by photopolymerization or thermalpolymerization, or the like. Especially, the material capable of forming a cholesteric liquid-crystal layer used preferably from the point of view of achieving bright display is a material which does not exhibit selective reflection characteristic in a visible light region.

That is, the cholesteric liquid-crystal layer exhibits characteristic of selectively reflecting a part of light with wavelengths near to the wavelength ncP of incident light in parallel to a helical axis as circularly polarized light in one of left and right directions with the wavelength ncP as its center wavelength when nc is the average refractive index on the basis of the helically oriented state of the cholesteric liquid-crystal layer, and P is the helical pitch. Hence, if the region of the selectively reflected light appears in a visible light region, the intensity of light allowed to be used for display is reduced disadvantageously. Any suitable orientation system such as a process of forming an oriented film by a rubbing treatment or an orientation process using application of electric field or magnetic field can be applied to the formation of the cholesteric liquid-crystal layer.

Incidentally, the thickness of the transparent layer is generally selected to be not smaller than 0.1 μm, particularly not smaller than 0.5 μm, more particularly not smaller than 1 μm. The refractive index anisotropy of nx≈ny>nz in the transparent layer means the fact that nz is smaller than each of nx and ny. The refractive index difference is not particularly limited and can be determined suitably in accordance with the birefringent characteristic, or the like, of the vertically oriented liquid-crystal cell to be compensated for.

Even in the case where the optical sheet according to the present invention is laminated on a background-art polarizer, the aforementioned effect of preventing light leakage can be obtained. The polarizer preferred from the point of view of handling properties due to reduction in thickness or increase in flexibility is, however, a polarizer constituted by an optical sheet 1 defined above, and a polarizing film 2 having a surface on which the optical sheet 1 is laminated as a transparent protective layer, as shown in FIG. 1. Particularly from the point of view of improvement in the effect of compensating for the vertically oriented liquid-crystal cell, the polarizing film 11 is laminated on a side of the optical sheet 1 opposite to the transparent layer 12 side so that the X axis direction (the direction of the highest in-plane refractive index) of the retardation film 11 is directed as parallel as possible with or as perpendicular as possible to the absorption axis thereof.

As the polarizing film, any suitable one in accordance with the background art may be used without particular limitation. That is, it is possible to use a film of a hydrophilic polymer, such as polyvinyl alcohol, partially formalized polyvinyl alcohol or partially saponified ethylene-vinyl acetate copolymer, which is made to absorb a dichromatic material containing iodine or/and a dichromatic dye such as an azo dye, an anthraquinone dye or a tetrazine dye so that the resulting film is drawn and oriented.

The optical sheet and the polarizing film may be formed to be separated from each other. It is, however, preferable from the point of view of preventing displacement of the optical axis and preventing entrance of foreign matter such as dust that the optical sheet and the polarizing film are fixed to each other. A suitable system such as a bonding system using a transparent adhesive layer can be applied to the fixation (lamination). The adhesive agent or the like used in the bonding system is not particularly limited in kind. An adhesive agent which does not require any high-temperature process for hardening and drying the adhesive agent in the bonding process is used preferably from the point of view of preventing the optical characteristic of the constituent members from changing. That is, an adhesive agent which requires neither long-term hardening process nor long drying time is used preferably. From this point of view, a hydrophilic polymer adhesive agent or an adhesive layer may be used preferably.

A transparent adhesive agent made of a suitable polymer such as acrylic polymer, silicon polymer, polyester, polyurethane, polyether or synthetic rubber can be used for forming the aforementioned adhesive layer. Particularly, an acrylic adhesive agent is used preferably from the point of view of optical transparency, adhesive characteristic, weather resistance, etc. As for the adhesive layer, one adhesive layer may be provided on one of opposite surfaces of the polarizer, or two adhesive layers may be provided on the opposite surfaces of the polarizer, for the purpose of bonding the liquid-crystal cell to a subject to be bonded in accordance with the necessity. In this case, it is preferable that a separator or the like is temporarily attached to the adhesive layer to prevent the surface of the adhesive layer from contamination or the like before the adhesive layer is exposed to the outside for practical use.

When the surface of the polarizing film on a side opposite to the optical sheet side in the polarizer is exposed, a transparent protective film maybe provided on the surface for the purpose of reinforcement, improvement of heat resistance and moisture resistance, etc. The transparent protective layer can be formed in accordance with the background art. That is, the transparent protective layer can be formed as a coating layer of a suitable resin such as triacetyl cellulose or as a layer of a laminate of resin films. The transparent protective layer may contain fine particles for the purpose of diffusing light, roughening the surface, etc.

The polarizer may be formed as a plate having a suitable functional layer such as a protective layer used for various purposes of water resistance, and so on, or an anti-reflection layer or/and an anti-glare layer used for the purpose of preventing surface reflection, in one or each of opposite surfaces of the polarizer, in the same manner as described above in the transparent protective layer. The anti-reflection layer can be formed suitably as a light-coherent film such as a fluorine polymer coat layer or a multilayer metal deposited film. The anti-glare layer can be formed by a suitable system in which surface-reflected light is diffused by a coating layer of a resin containing fine particles or by a fine asperity structure given to the surface by a suitable system such as embossing, sandblasting or etching.

Examples of the fine particles include inorganic particles and organic particles with a mean particle size of from 0.5 to 20 $\mu$m. The inorganic particles which may be electrically conductive are made of silica, calcium oxide, alumina, titania, zirconia, tin oxide, indium oxide, cadmium oxide, antimony oxide, etc. The organic particles are made of crosslinked or non-crosslinked suitable polymers such as polymethyl methacrylate and polyurethane. One member or a combination of two or more members suitably selected from the inorganic particles and the organic particles may be used as the fine particles.

The optical sheet or polarizer according to the present invention may be used preferably for suitable purposes such as the purpose of forming a liquid-crystal display device. Particularly, the polarizer in which a polarizing film is laminated on the surface of the optical sheet opposite to the transparent layer side of the optical sheet so that the direction of the highest in-plane refractive index of the retardation film is parallel or perpendicular to the absorption axis thereof as much as possible can be used preferably for optical compensation for the vertically oriented liquid-crystal cell. The liquid-crystal display device can be formed by arranging polarizers in the form of crossed-Nicol on opposite sides of the vertically oriented liquid-crystal cell 3 while an optical sheet-including polarizer is used as one of the polarizers and the transparent layer 12 of the optical sheet-including polarizer is disposed on the side of the cell, as shown in FIG. 1.

The optical sheet-including polarizer preferred from the point of view of achieving wide-ranging viewing angles due to the high-grade compensation is a polarizer in which the absolute value of the thicknesswise retardation of the transparent layer of the polarizer is in a range of from 0.5 time to 1.3 times, particularly in a range of from 0.7 time to 1.0 time as large as the absolute value of the thicknesswise retardation of the liquid-crystal cell. Incidentally, the thicknesswise retardation of the transparent layer is defined by the product of $\{(nx+ny)/2-nz\}$ and the layer thickness of the transparent layer.

In the above description, when the absolute value of the thicknesswise retardation of the transparent layer does not satisfy the predetermined magnifying power, a phase retarder 4 may be disposed between the vertically oriented liquid-crystal cell 3 and the polarizer in accordance with the necessity as shown in FIG. 1 so that the sum of the absolute value of the thicknesswise retardation of the transparent layer and the absolute value of the thicknesswise retardation of the phase retarder 4 can be adjusted to be in a range of from 0.5 time to 1.3 times, preferably in a range of from 0.7 to 1.0 time as large as the absolute value of the thicknesswise retardation of the liquid-crystal cell.

In the aforementioned case, one phase retarder or a pair of phase retarders may be disposed between the liquid-crystal cell 3 and the optical sheet 1-including polarizer or/and between the liquid-crystal cell 3 and the other polarizer 22 as shown in FIG. 1. When such a pair of phase retarders are disposed between the liquid-crystal cell and both of the polarizers, adjustment is preferably performed to satisfy the aforementioned magnifying power in the condition that the absolute values of the thicknesswise retardations of the pair of phase retarders are summed up.

As the phase retarder, it is possible to use a suitable one exhibiting refractive index anisotropy of nx≈ny>nz because the phase retarder is provided for correcting too much and too little magnifying power of the thicknesswise retardation of the transparent layer of the optical sheet, for example, generally by compensating for shortage of the magnifying power. Hence, the refractive index anisotropy of nx≈ny>nz can be taken similarly to the case of the transparent layer described above. The phase retarder having such characteristic can be obtained in the same manner as described above in the retardation film. Incidentally, the phase retarder used may be provided as a laminate of two or more retardation layers to adjust the optical characteristic thereof.

In the present invention, the liquid-crystal display device can be formed in accordance with the background art without having any particular limitation except that the aforementioned combination of polarizers are disposed in the form of crossed-Nicol on opposite sides of the vertically oriented liquid-crystal cell. Hence, as the polarizer having no optical sheet, it is possible to use a suitable one in accordance with the background art as described above by way of example. Also a system for driving the liquid-crystal cell or the like is not particularly limited. Suitable optical devices such as a phase retarder, a light-diffusing plate, a backlight, a condenser sheet, a reflection plate, or the like, may be disposed in suitable positions in accordance with the necessity when the liquid-crystal display device is formed. Although either of the polarizers may be used on the visual side of the liquid-crystal display device, in most cases, it is generally preferable from the point of view of display quality or the like that the optical sheet-including polarizer is used on the visual side.

EXAMPLE 1

A rubbed and oriented film was formed on one of opposite surfaces of a retardation film constituted by a drawn film of polycarbonate and exhibiting Nz of 0.5 and (nx−ny)d of 260 nm. A cholesteric liquid crystal (CB-15 made by Dainippon Ink and Chemicals, Inc.) was applied onto the rubbed and oriented film and dried to form a transparent layer of a coating film which has a thickness of 5 μm and which exhibits refractive index anisotropy of nx≈ny>nz. Thus, an optical sheet was obtained.

On the other hand, a polyvinyl alcohol film was dyed in an aqueous solution containing iodine and then uniaxially drawn between different-circumferential-velocity rolls in an aqueous solution containing boric acid to thereby obtain a polarizing film. The drawn film-exposed side of the optical sheet was bonded onto one of opposite surfaces of the polarizing film through a polyvinyl alcohol adhesive agent. A triacetyl cellulose film was bonded onto the other surface of the polarizing film through a polyvinyl alcohol adhesive agent. Thus, a polarizer was obtained. Incidentally, the optical sheet was laminated on the polarizing film so that the direction (nx) of the highest in-plane refractive index of the drawn film in the optical sheet is parallel to the axis of absorption of the polarizing film.

The polarizer was disposed on one of opposite sides of a vertically oriented liquid-crystal cell while the optical sheet side of the polarizing film is disposed on the cell side. A polarizer formed by adhering triacetyl cellulose films onto opposite surfaces of the polarizing film was disposed on the other side of the cell so that the two polarizers were arranged in the form of crossed-Nicol. Thus, a liquid-crystal display device is formed. In this case, the absolute value of the thicknesswise retardation of the transparent layer in the optical sheet-including polarizer was 0.8 time as large as the absolute value of the thicknesswise retardation of the liquid-crystal cell. The contrast ratio was measured in the condition that the obtained liquid-crystal display device was viewed obliquely at an inclination angle of 70 degrees with respect to the normal line in an azimuth displaced by 45 degrees from the optical axis of the polarizers disposed in the form of crossed-Nicol (this condition applies to the following Example and Comparative Examples). As a result, the contrast ratio was 12 in each of the case where the front surface was put on the visual side and the case where the rear surface was put on the visual side.

EXAMPLE 2

An optical sheet and a polarizer including the optical sheet were obtained in the same manner as that in Example 1 except that the thickness of the transparent layer made of a coating film was set to 2 μm. A liquid-crystal display device was formed by use of the polarizer. In this case, a phase retarder which was made of a drawn film of polycarbonate exhibiting refractive index anisotropy of nx≈ny>nz and in which the absolute value of the thicknesswise retardation of the phase retarder was 0.48 time as large as the absolute value of the thicknesswise retardation of the liquid-crystal cell was interposed between the liquid-crystal cell and the optical sheet-including polarizer. Hence, controlling was performed so that the sum of the absolute value of the thicknesswise retardation of the phase retarder and the absolute value of the thicknesswise retardation of the transparent layer in the optical sheet-including polarizer was 0.8 time as large as the absolute value of the thicknesswise retardation of the liquid-crystal cell. The contrast ratio in the predetermined oblique viewing direction in the obtained liquid-crystal display device was also 12 in each of the case where the front surface was put on the visual side and the case where the rear surface was put on the visual side.

COMPARATIVE EXAMPLE 1

A polarizer was obtained in the same manner as that in Example 1 except that the optical sheet was replaced by a triacetyl cellulose film. A liquid-crystal display device was formed by use of the polarizer. The contrast ratio in the predetermined oblique viewing direction was 2.

COMPARATIVE EXAMPLE 2

A liquid-crystal display device was formed in the same manner as that in Comparative Example 1 except that a retardation film which was constituted by a drawn film of polycarbonate exhibiting refractive index anisotropy of nx≈ny>nz and in which the absolute value of the thicknesswise retardation of the retardation film was 0.8 time as large as the absolute value of the thicknesswise retardation of the liquid-crystal cell was interposed between one polarizer and the liquid-crystal cell to thereby form the liquid-crystal display device as a compensatory one. The contrast ratio in the predetermined oblique viewing direction was 6 in each of the case where the front surface was put on the visual side and the case where the rear surface was put on the visual side.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical sheet comprising:

a retardation film; and a transparent layer provided on one of opposite surfaces of said retardation film;

wherein said retardation film exhibits $Nz=(nx-nz)/(nx-ny)$ in a range of from 0.4 to 0.6, both not inclusively, and $(nx-ny)d$ in a range of from 200 to 350 nm in which d is a thickness of said retardation film, nz is a refractive index in a direction of a Z axis expressing a direction of the thickness d of said retardation film, nx is a refractive index in a direction of an X axis expressing a direction of said retardation film in a plane perpendicular to said Z axis while said X axis expresses a direction of the highest in-plane refractive index, and ny is a refractive index in a direction of a Y axis expressing a direction of said retardation film perpendicular both to said Z axis and to said X axis; and wherein said transparent layer has a thickness not larger than 10 μm and exhibits refractive index anisotropy of $nx \approx ny > nz$.

2. An optical sheet according to claim 1, wherein said transparent layer is made of a coating film of an organic material.

3. An optical sheet according to claim 1, wherein said transparent layer is constituted by a cholesteric liquid-crystal layer.

4. A polarizer comprising a laminate of an optical sheet according to claim 1 and a polarizing film.

5. A polarizer according to claim 4, wherein said polarizing film is disposed on a side of said optical sheet opposite to the transparent layer side of said optical sheet so that said X axis direction of said retardation film of said optical sheet is parallel or perpendicular to an axis of absorption thereof.

6. A liquid-crystal display device comprising:

a vertically oriented liquid-crystal cell; and a pair of polarizers disposed in the form of crossed Nicol on opposite sides of said liquid-crystal cell, wherein one of said polarizers is constituted by a polarizer according to claim 5; and wherein a transparent layer of said polarizer is positioned on a side of said liquid-crystal cell.

7. A liquid-crystal display device according to claim 6, wherein an absolute value of a thicknesswise retardation defined by a product of $\{(nx+ny)/2-nz\}$ and a layer thickness of said transparent layer in said polarizer defined in claim 5 is in a range of from 0.5 time to 1.3 times as large as an absolute value of a thicknesswise retardation of said liquid-crystal cell.

8. A liquid-crystal display device comprising:

a vertically oriented liquid-crystal cell;

a pair of polarizers disposed in the form of crossed-Nicol on opposite sides of said liquid-crystal cell; and a phase retarder disposed between said liquid-crystal cell and one or each of said polarizers, one of said polarizers being constituted by a polarizer according to claim 5;

wherein said phase retarder exhibits refractive index anisotropy of $nx \approx ny > nz$; and wherein an absolute value of a thicknesswise retardation defined by a product of $\{(nx+ny)/2-nz\}$ and a layer thickness of the transparent layer in said polarizer according to claim 5 is in a range of from 0.5 time to 1.3 times as large as an absolute value of a thicknesswise retardation of said liquid-crystal cell.

* * * * *